(12) United States Patent
Eynon et al.

(10) Patent No.: US 11,747,433 B2
(45) Date of Patent: Sep. 5, 2023

(54) BASE STATION FOR MARINE DISPLAY

(71) Applicant: NAVICO HOLDING AS, Egersund (NO)

(72) Inventors: Pablo Eynon, Auckland (NZ); Paul Robert Bailey, Auckland (NZ); Chris Richardson, Auckland (NZ)

(73) Assignee: Navico, Inc., Tulsa, OK (US)

( * ) Notice: Subject to any disclaimer, the term of this patent is extended or adjusted under 35 U.S.C. 154(b) by 799 days.

(21) Appl. No.: 16/437,035

(22) Filed: Jun. 11, 2019

(65) Prior Publication Data

US 2019/0293747 A1 Sep. 26, 2019

Related U.S. Application Data

(63) Continuation of application No. 14/880,901, filed on Oct. 12, 2015, now abandoned.

(51) Int. Cl.
| | |
|---|---|
| *G01S 7/00* | (2006.01) |
| *H04W 4/021* | (2018.01) |
| *G01S 15/89* | (2006.01) |
| *G01S 15/96* | (2006.01) |
| *G01S 13/86* | (2006.01) |
| *G01S 7/521* | (2006.01) |
| *G01S 7/04* | (2006.01) |

(Continued)

(52) U.S. Cl.
CPC ............... *G01S 7/003* (2013.01); *G01S 7/04* (2013.01); *G01S 7/521* (2013.01); *G01S 7/6218* (2013.01); *G01S 7/6281* (2013.01); *G01S 13/862* (2013.01); *G01S 15/86* (2020.01); *G01S 15/89* (2013.01); *G01S 15/96* (2013.01); *H04W 4/021* (2013.01)

(58) Field of Classification Search
None
See application file for complete search history.

(56) References Cited

U.S. PATENT DOCUMENTS

| | | |
|---|---|---|
| 4,193,129 A | 3/1980 | Wiggins et al. |
| 6,273,771 B1 | 8/2001 | Buckley et al. |

(Continued)

OTHER PUBLICATIONS

Raymarine WI-FISH—Wi-fi CHIRP DownVision™ Sonar—Wireless Black Box Sonar for Smartphones and Tablets website visited Oct. 25, 2016 (4 pgs.).

(Continued)

*Primary Examiner* — Hovhannes Baghdasaryan
(74) *Attorney, Agent, or Firm* — Nelson Mullins Riley & Scarborough LLP

(57) ABSTRACT

Various implementations described herein are directed to a device having a housing configured for mounting to a watercraft. The device may include a power interface configured to receive power from a power source. The device may include a network interface configured to receive marine data from a plurality of different data sources. The device may include a sonar interface configured to receive sonar data from a sonar device. The device may include a display interface coupled to the power interface, the network interface, and the sonar interface. The display interface may be configured to receive power from the power interface, receive marine data from the network interface, receive sonar data from the sonar interface, and provide power, marine data, and sonar data to a remote marine display that is separate from the device.

20 Claims, 7 Drawing Sheets

(51) Int. Cl.
*G01S 7/62* (2006.01)
*G01S 15/86* (2020.01)

(56) References Cited

U.S. PATENT DOCUMENTS

| | | |
|---|---|---|
| 6,415,209 B1 | 7/2002 | Reimer |
| 6,508,192 B2 | 1/2003 | Lentine |
| 6,909,946 B1 | 6/2005 | Kabel et al. |
| 2008/0159413 A1 | 7/2008 | Mehan |
| 2009/0099764 A1 | 4/2009 | Ninomiya et al. |
| 2011/0099392 A1* | 4/2011 | Conway ............... G01C 21/367 |
| | | 713/300 |
| 2015/0141086 A1 | 5/2015 | Chan et al. |

OTHER PUBLICATIONS

Garmin Fishfinder 240 website visited Oct. 25, 2016 (1 pg.) https://buy.garmin.com/en-US/US/on-the-water/discontinued/fishfinder-240/prod109.html.

Humminbird MS M Quick Disconnect Mount 7400077-1 website visited Oct. 25, 2016 (2 pgs.) http://humminbird.com/Products/MS-M/.

* cited by examiner

BASE STATION FOR MARINE DISPLAY

CROSS-REFERENCE TO RELATED APPLICATION(S)

This application claims priority to and is a continuation of U.S. patent application Ser. No. 14/880,901, entitled "Base Station for Marine Display" filed Oct. 12, 2015, which is hereby incorporated by reference in its entirety.

BACKGROUND

This section is intended to provide information to facilitate an understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

When trolling, various marine data may be used to locate fish. For instance, an angler's vessel may be equipped with sonar to provide an underwater view. Sonar images may be displayed on a marine display. However, some users remove their sonar device and their marine display from their vessel after use. Unfortunately, removal of the sonar device and/or marine display may be difficult and cumbersome due to multiple connector set-ups between the sonar device and the marine display.

SUMMARY

Described herein are implementations of various technologies for a device having a housing configured for mounting to a watercraft. The device may include a power interface configured to receive power from a power source. The device may include a network interface configured to receive marine data from a plurality of different data sources. The device may include a sonar interface configured to receive sonar data from a sonar device. The device may include a display interface coupled to the power interface, the network interface, and the sonar interface. The display interface may be configured to receive power from the power interface, receive marine data from the network interface, receive sonar data from the sonar interface, and provide power, marine data, and sonar data to a remote marine display that is separate from the device.

Described herein are also implementations of technologies for a base station having a waterproof housing configured for mounting to a watercraft. The base station may include a power interface configured to receive power from a power source. The base station may include a network interface configured to receive marine data from a plurality of different data sources, including one or more of a geocoordinate data source, a national marine electronics association (NMEA) data source, and an Ethernet data source. The base station may include a sonar interface configured to receive sonar data from a sonar device. The base station may include a radar interface configured to receive radar data from a radar device. The base station may include a display interface coupled to the power interface, the network interface, the sonar interface, and the radar interface. The display interface may be configured to receive power from the power interface, receive marine data from the network interface, receive sonar data from the sonar interface, receive radar data from the radar device, and provide power, marine data, sonar data, and radar data to one or more marine displays via one or more wired or wireless connections. The one or more marine displays are separate from the base station.

Described herein are implementations of various technologies for a system having a marine display and a base station. The marine display may be configured to display images associated with marine data and sonar data. The base station may be configured for mounting to a watercraft. The base station may include a power interface configured to receive power from a power source. The base station may include a network interface configured to receive marine data from a plurality of different data sources. The base station may include a sonar interface configured to receive sonar data from a sonar device. The base station may include a display interface coupled to the power interface, the network interface, and the sonar interface. The display interface may be configured to receive power from the power interface, receive marine data from the network interface, receive sonar data from the sonar interface, and provide power, marine data, and sonar data to the marine display.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques are described herein with reference to the accompanying drawings. It should be understood, however, that the accompanying drawings illustrate only the various implementations described herein and are not meant to limit the scope of various techniques described herein.

DETAILED DESCRIPTION

Various implementations described herein refer to and are directed to using a base station that may be installed on or mounted to a vessel (e.g., watercraft, boat, ship, etc.). The base station may include multiple inputs for various connections (e.g., power, sonar, radar, NMEA (National Marine Electronics Association), GPS (Global Positioning System), Ethernet, etc.). However, the base station may not include a marine display, and instead, the base station may be configured to communicate with one or more remote marine displays via one or more wired or wireless connections. As such, the base station may be permanently mounted to the watercraft, and the base station may be configured to provide power and/or data to a separate, detached, and/or remote marine display. In various implementations, the base station may include computing and/or processing capability, and the base station may include circuitry, such as, e.g., sonar circuitry, radar circuitry, and/or digital signal processing circuitry, capable of receiving and processing marine based data signals associated with the multiple inputs for the various connections so as to multiplex or serialize these multiple data signals over a single communication link (wired or wireless) to the one or more marine displays. In some implementations, the base station may be referred to as an "intelligent" device that may be primarily configured for processing incoming data received from multiple data sources, and the one or more remote marine displays may be referred to as "dummy" devices that may be primarily configured for displaying various images associated with the processed data received from the base station.

Various implementations of a base station and a marine display will now be described in reference to FIGS. 1A-4.

Figure 1A:
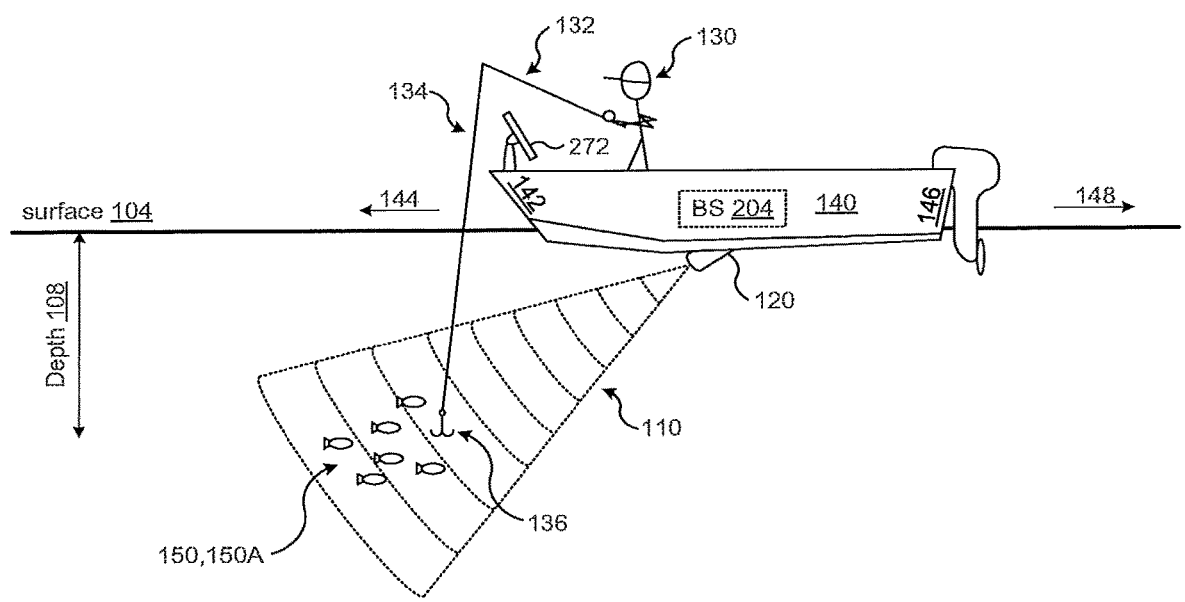
FIGS. 1A-1C illustrate views of using a base station and a marine display in accordance with various implementations described herein.
Figure 1B:
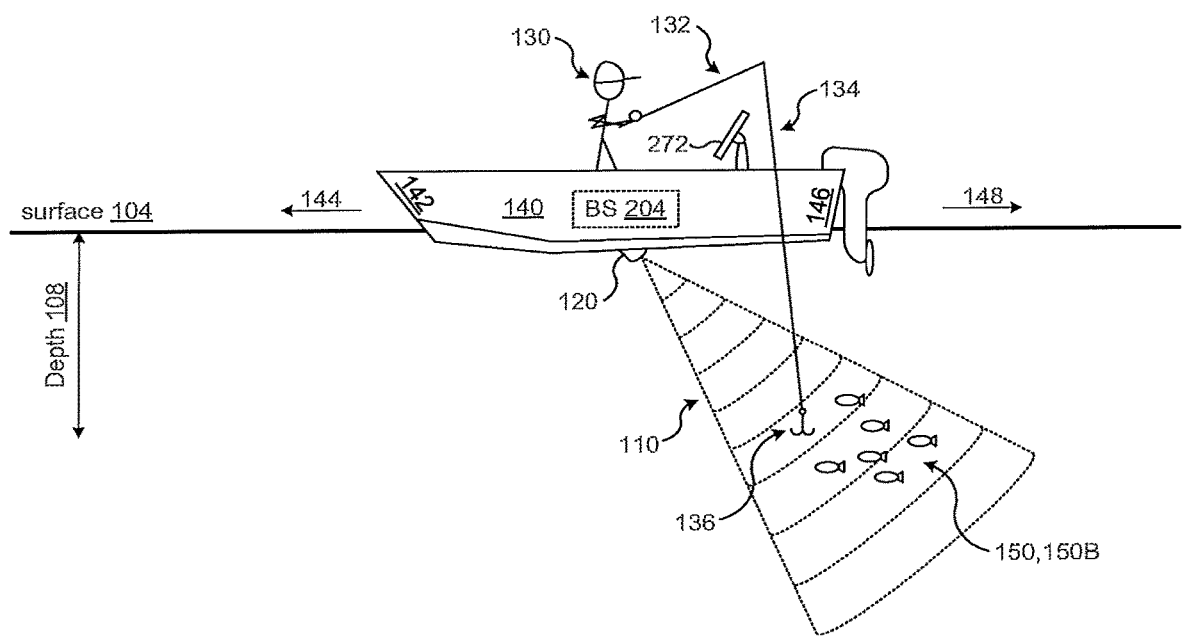
Figure 1C:
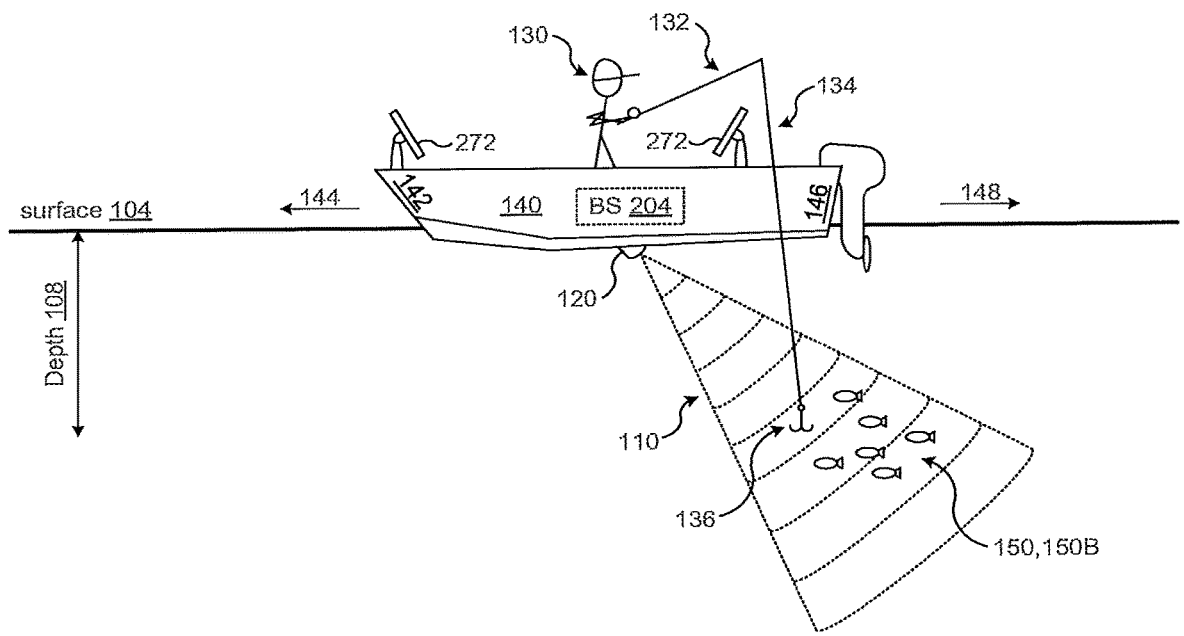

FIGS. 1A-1C illustrate various views of using a base station 204 and a marine display 272 in accordance with various implementations described herein. In particular, FIG. 1A illustrates a view 100A of a system 100 for using the base station 204 and the marine display 272 along with a sonar device 120 that is directed in a first direction 144 (e.g., forward (fore) direction) relative to a bow 142 of a watercraft 140. FIG. 1B illustrates another view 200B of the system 100 for using the base station 204 and the marine display 272 along with the sonar device 120 directed in a second direction 148 (e.g., rear (aft) direction) relative to a stern 146 of the watercraft 140. FIG. 1C illustrates another view 200 C of the system 100 for using the base station 204 and multiple marine displays 272 along with the sonar device 120 so as to allow an angler 130 to move about the vessel 140 from one position (or location) on the watercraft 140 to another position (or location) on the watercraft 140 without having to move the marine display 272. As shown in FIGS. 1A-1C, the sonar device 120 may be positioned or located below a surface 104 of a body of water 102 in which the watercraft 140 is deployed.

The sonar device 120 may include a sonar transducer configured to provide various angular ranges of view in various directions, such as, e.g., approximately a 90° vertical view along with approximately a 15° to 30° horizontal view. The angular ranges of view may include or at least be extended to include angular ranges of vertical views from/between 0° to more than 90° along with angular ranges of horizontal views from/between 0° to 180°, or in some cases, 360° view. Further, the sonar device 120 and/or the sonar transducer may be configured to manually or automatically rotate (or pivot or directionally adjust) vertically and/or horizontally so as to rotate the view (i.e., field of view).

During operation, the sonar device 120 may be configured to use sonar for imaging various environmental features (e.g., fish, plants, rocks, lures, bait, etc.) in the body of water 102. This imaging may include mapping an underwater environment below the surface 104 of the body of water 102 between the surface 104 and a bottom or floor 106 of the body of water 102. For instance, this imaging may include various images of fish or schools of fish 150 captured beneath the watercraft 140 by the sonar device 120 directed in any direction, such as the forward direction 144 with the sonar beam 110, as shown in reference to FIG. 1A. In some implementations, the sonar device 120 may be configured to generate one or more two-dimensional (2D) sonar images of the underwater environment in a column of water. In some other implementations, the sonar device 120 (e.g., sonar transducer) may be configured to generate one or more three-dimensional (3D) sonar images of the underwater environment in a column of water.

In reference to FIGS. 1A-1C, the base station 204 may be implemented as a computing device that is coupled/mounted to the watercraft 140 and used to communicate with the marine display 272 for displaying images associated with sonar data received from the sonar device 120, along with various other marine data (e.g., radar, NMEA, GPS, Ethernet, etc.) received from various other data sources. The base station 204 may also be configured to provide or supply power to the marine display 272 for powering and/or or charging the marine display 272. Further, the base station 204 may include at least one processing component (e.g., processor, digital signal processor, etc.) and memory having instructions configured to cause the processor to perform various actions and/or functions including display of images associated with the sonar device 120 and various other data sources. The marine display 272 may be various types of displays, such as, e.g., marine electronics device, multi-function display (MFD), personal computer (PC), laptop, smart phone, tablet, etc. In some cases, the base station 204 may be configured to simultaneously display multiple images associated with the sonar device 120 in various display modes of operation, such as, e.g., a split screen mode of operation.

Further, as shown in FIG. 1A, the sonar device 120 may be used to locate and/or track fish 150, 150A in the body of water 102 beneath the watercraft 140 at various depths 108 proximate to the bow 142 of the watercraft 140. Similarly, as shown in FIG. 1B, the sonar device 120 may be used to locate and/or track fish 150, 150B in the body of water 102 beneath the watercraft 140 at the various depths 108 proximate to the stern 146 of the watercraft 140. Generally, the sonar device 120 may be used to locate and/or track fish 150 at any relative position in between the bow 142 and the stern 146 of the watercraft 140. Further, as shown in FIG. 1C, multiple marine displays 272 may be used and positioned at multiple positions or locations on the watercraft 140 by the angler 130 depending on preference of the angler 130. In these instances, the base station 204 may be configured to communicate with and provide power and data to each of the one or more marine displays 272 positioned or located throughout the watercraft 140.

In some implementations, the sonar device 120 may be used to determine a depth of the fish 150 in the body of water 102 near the watercraft 140. Once the depth 108 of the fish 150 is determined, then the angler 130 may cast a lure or bait 136 in the body of water 102 at the determined depth 108. For instance, during trolling, the lure or bait 136 may be coupled to a casting device, such as a rod 132 (e.g., fishing rod or pole), via a line 134 (e.g., fishing line). The rod 132 may be configured for casting the lure or bait 136 by the angler 130. As shown in FIGS. 1A-1C, the angler 130 may cast the lure or bait 136 into the body of water 102 proximate to the bow side 142, the stern side 146, or anywhere or any side in between, such as, e.g., the starboard side and/or the port side of the watercraft 140, while the angler 130 is positioned within the watercraft 140.

In some implementations, the sonar device 120 may be electrically coupled to the base station 204 via one or more electrical wires or cables (not shown) passing through the watercraft 140. The base station 204 may be configured to record sonar data received from the sonar device 120 via the electrical cables. Further, the base station 204 may be configured to control operation of the watercraft 140 via user interaction with the marine display 272. In some other instances, operation of the watercraft 140 may be controlled via user interaction with a foot-pedal (not shown) positioned on the watercraft 140 and coupled to the base station 204.

Generally, the term sonar (i.e., SOund Navigation And Ranging) may refer to various techniques for propagating sound underwater to detect objects on or under a surface of a body of water, such as fish, lures, plants, rocks, sea floor, etc. One type of sonar technology refers to active sonar that is configured to emit pulses of sound waves while receiving echoes, which refers to pinging. Sonar may be used to determine acoustic locations and/or measurements of echo characteristics for targets and objects in a body of water. Further, acoustic frequencies used in sonar based devices may vary from low frequency (i.e., infrasonic) to high frequency (i.e., ultrasonic).

Figure 2A:
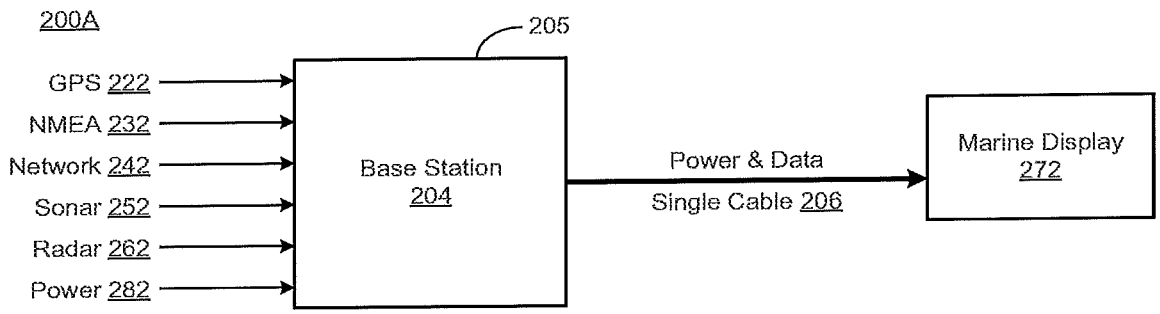
FIGS. 2A-2C illustrate various block diagrams of a base station and a marine display in accordance with various implementations described herein.
Figure 2B:
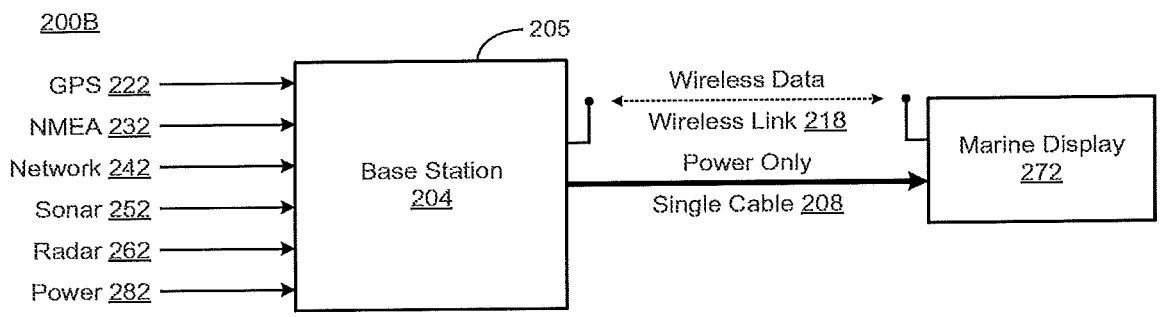
Figure 2C:
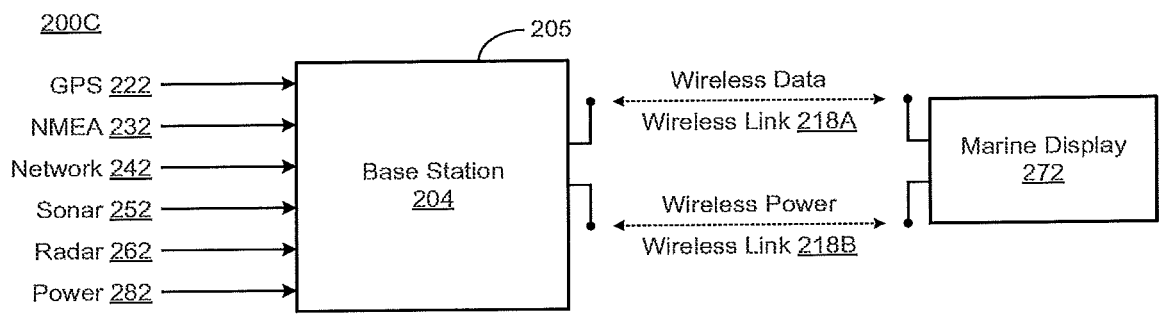
Figure 2D:
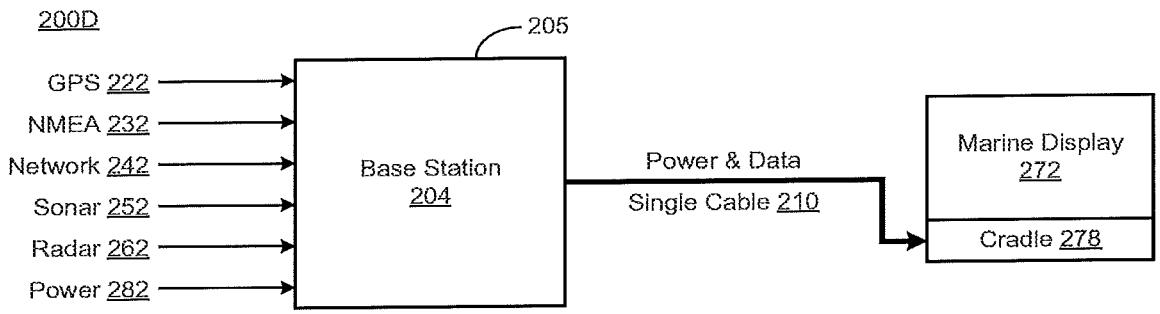
FIGS. 2D-2F illustrates various other block diagrams of a base station and a marine display in accordance with various implementations described herein.
Figure 2E:
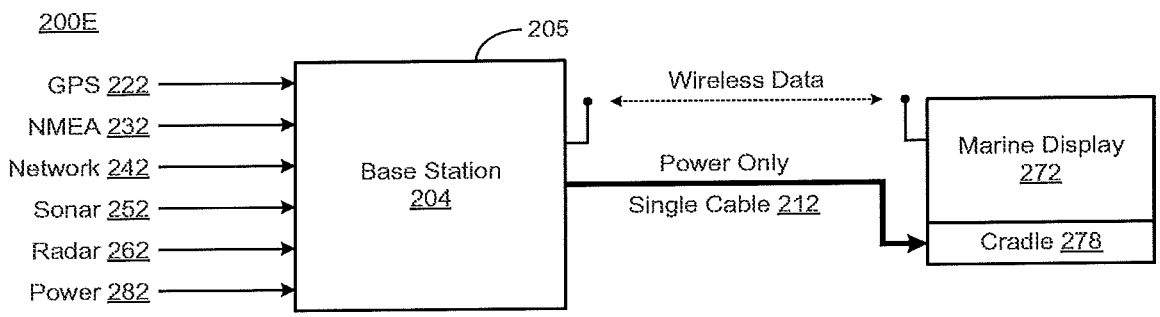
Figure 2F:
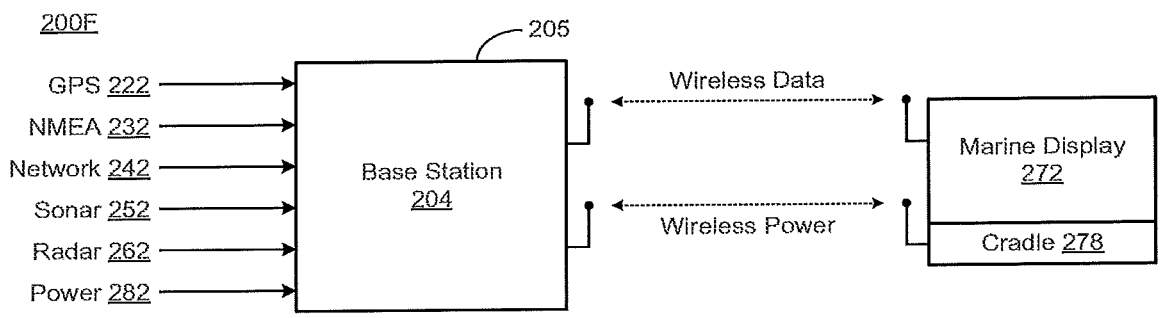
Figure 3:
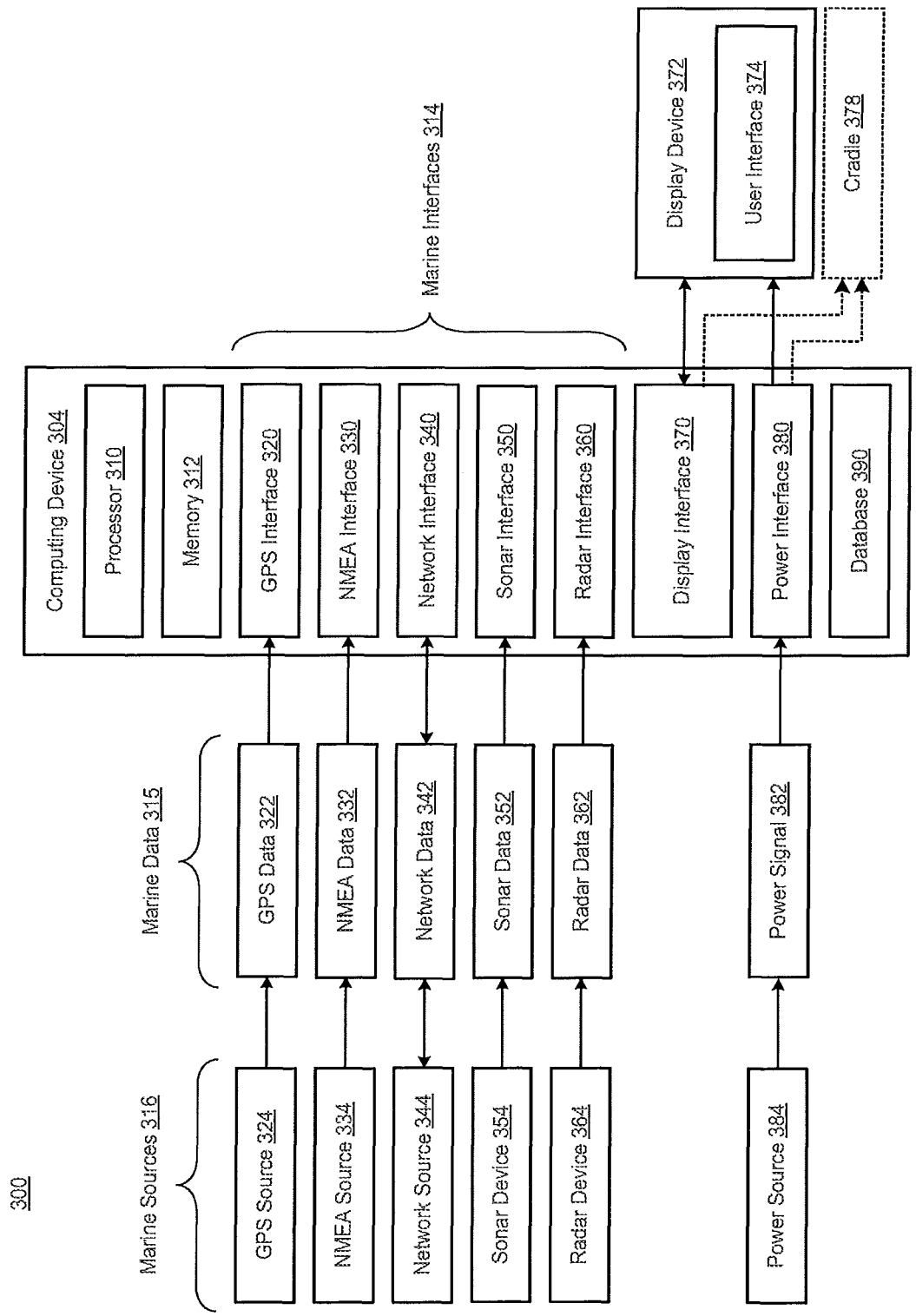
FIG. 3 illustrates a computing device for implementing a base station and a marine display in accordance with various implementations described herein.

In some implementations, the base station 204 may be used to communicate with the marine display 272 so as to display images associated with other marine data and devices, such as, e.g., radar data received from a radar device (as shown and described in reference to FIGS. 2A-3). Generally, radar refers to an object-detection device or system that uses radio waves (e.g., radio frequency (RF) waves or microwaves) to determine various parameters and/or properties of an object, such as, e.g., range, angle, and/or velocity of an object. In marine based application, radar may be used to detect above sea-level objects, such as, e.g., watercraft, aircraft, weather formations, terrain, and/or other objects. In some cases, a radar device or system may be configured to transmit radio waves (e.g., RF waves or microwaves) that may reflect from any object in a transmission path so as to determine various parameters and/or properties of the object or objects.

In various implementations, the base station 204 may be coupled to various marine based data buses and/or networks, such as, e.g., the National Marine Electronics Association (NMEA) bus or network, including, e.g., NMEA 0180, 0182, 0183, 2000, and the future OneNet standard. The base station 204 may send and/or receive data to and/or from another device attached to the NMEA 2000 bus. For instance, the base station 204 may transmit commands and receive data from a motor or a sensor using an NMEA 2000 bus. In some implementations, the base station 204 may be capable of steering a vessel and/or controlling speed of the vessel, i.e., autopilot. For instance, one or more waypoints may be input to the base station 204, and the base station 204 may be configured to steer the vessel to the one or more waypoints. Further, the base station 204 may be configured to transmit and/or receive NMEA 2000 compliant messages, messages in a proprietary format that do not interfere with NMEA 2000 compliant messages, and/or messages in any other format. The base station 204 may be attached to various other communication buses and/or networks configured to use various other types of protocols accessible via, e.g., NMEA 2000, NMEA 0183, Ethernet, Proprietary wired protocol, etc.

FIGS. 2A-2C illustrate various block diagrams of the base station 204 and the marine display 272 in accordance with various implementations described herein. As shown in FIGS. 2A-2C, the base station 204 may be configured to provide power and data to the marine display 272 in various ways. In particular, FIG. 2A illustrates a block diagram 200A of the base station 204 and the marine display 272 connected via a single cable 206, FIG. 2B illustrates a block diagram 200B of the base station 204 and the marine display 272 connected via the single cable 206 and a wireless link 218, and FIG. 2C illustrates a block diagram 200C of the base station 204 and the marine display 272 connected via a first wireless link 218A, and a second wireless link 218B.

In reference to FIG. 2A, the base station 204 may be implemented as a device having a housing 205 configured for mounting to a watercraft, such as, e.g., the watercraft 140 of FIG. 1A. The base station 204 may be configured with multiple inputs for various connections for receiving various input signals, such as, e.g., geo-coordinate signals 222 (e.g., GPS signals), NMEA signals 232, network signals 242 (e.g., Ethernet signals), sonar signals 252, radar signals 262, and/or power signals 282. Further, the base station 204 may be configured to provide the input power signal 282 and the input data signals 222, 232, 242, 252, 262 as output signals to the marine display 272 via the single cable 206. In this instance, the single cable 206 may include a first wired circuit configured to output the power signal 282 to the marine display 272 and a second wired circuit (that is separate from the first wired circuit) configured to output the data signals 222, 232, 242, 252, 262 to the marine display 272. In some cases, the first and second wired circuits may share a common ground wire.

In some implementations, the housing 205 of the base station 204 may include a waterproof container or a box having a rigid three-dimensional (3D) structural framework or casing formed of a high-strength metal based material, such as, e.g., aluminum, steel, stainless steel, titanium, magnesium, tungsten, and/or any other type of metal material, including other high-strength metals and various alloys of multiple different high-strength metals. The waterproof housing 205 may be used to enclose or encase electrical circuit components and various other components of the base station 204. In some cases, the housing 205 may be formed of a rigid polymer based material including various polymer blends. For instance, various polymers blends may include combinations of one or more of polypropylene (PP), polyethylene (PE), block copolymer polypropylene (BCPP), rubber, and reinforcing filler(s). In other cases, the housing 205 may include a coating of a flexible and shock-absorbing type of polymer based material, such as, e.g., an isoprene type polymer based material, including polymer based rubber or any other type of flexible and shock-absorbing polymer-rubber based material. The coating may comprise thermos plastic rubber (TPR) or various other types of similar or comparable material, including, e.g., various polymer blends. As such, the materials used for forming, fabricating, and/or manufacturing the housing 205 may provide for strength, rigidity, and shock-absorbing characteristics so as to thereby improve reliability and longevity of the housing 205 and components of the base station 204 encased therein.

In reference to FIG. 2B, the base station 204 may be configured to provide the power signal 282 as an output signal to the marine display 272 via the single cable 206, and further, the base station 204 may be configured to provide the data signals 222, 232, 242, 252, 262 as a wireless output signal to the marine display 272 via a wireless communication link 218. In this instance, the single cable 206 may include a single wired circuit configured to provide power signals 282 to the marine display 272, and the wireless communication link 218 may make use of a transceiver configured to output data signals associated with input signals 222, 232, 242, 252, 262 to the marine display 272. As such, the base station 204 and the marine display 272 may be equipped with transceivers (not shown) having antennas configured to communicate with each other. In some instances, the wireless communication link 218 may be used to bi-directionally transmit and receive data signals between the base station 204 and the marine display 272. Further, various wireless communication protocols and networks may be used to wirelessly communicate over the wireless communication link 218, including, e.g., WiFi, Bluetooth, etc.

In reference to FIG. 2C, the base station 204 may be configured to provide the power signal 282 as a first wireless output signal to the marine display 272 via a first wireless link 218A, and the base station 204 may be configured to provide the data signals 222, 232, 242, 252, 262 as a second wireless output signal to the marine display 272 via a second wireless link 218B. In this instance, the first wireless link 218A may make use of a first transceiver configured to output the first wireless output signal associated with the power signal 282 to the marine display 272. Further, the second wireless link 218B may make use of a second transceiver configured to output data signals associated with input signals 222, 232, 242, 252, 262 to the marine display 272. As such, the base station 204 and the marine display 272 may be equipped with multiple transceivers (not shown) having antennas configured to communicate with each other. Further, in some instances, the first wireless link 218A may be configured to bi-directionally transmit and receive data signals between the base station 204 and the marine display 272. Various wireless communication protocols and networks may be used to wirelessly communicate over the first wireless link 218A, including, e.g., WiFi, Bluetooth, etc. In addition, various wireless powering/charging systems may be used to wirelessly provide power and charge over the second wireless link 218B, including, e.g., inductive and radio frequency (RF).

In reference to FIGS. 2A-2C, the power and data connections may be wired via the single cable 208 (e.g., a power over Ethernet cable). In some implementations, the power and data connections may be wireless via the one or more wireless connections 218, 218A, 218B (e.g., WiFi data and wireless power, such as inductive power). In some other implementations, the power and data connections may be a combination of wired and wireless via the single cable 208 and/or one or more wireless connections 218, 218A, 218B (e.g. wired power and wireless data). Further, the marine display 272 may include or may be embodied as a purpose built marine display, such as, e.g., similar to a multi-function display (MFD), with only a single connector, with no connectors, or in an alternate embodiment as a third-party device, such as, e.g., a tablet. In some implementations, the base station 204 may also serve as a cradle or make use of a cradle to hold the marine display 272. In this instance, the cradle may be implemented as a waterproof enclosure with some capability to provide waterproofing to a non-waterproof consumer device (e.g., a tablet). Therefore, the marine display 272 may include one or more power sources (e.g., batteries, rechargeable batteries, etc.) that may be used for power, and the marine display 272 may include power and/or charging circuitry for remote applications.

FIGS. 2D-2F illustrate various block diagrams of the base station 204 and the marine display 272 in accordance with various implementations described herein. As shown in FIGS. 2D-2F, the base station 204 may be configured to provide power and data to the marine display 272 in various ways, including use of a cradle 278. In particular, FIG. 2D illustrates a block diagram 200D of the base station 204 and the marine display 272 connected via the single cable 206 and the cradle 278, FIG. 2E illustrates a block diagram 200E of the base station 204 and the marine display 272 connected via the single cable 206, the cradle 278, and the wireless link 218, and FIG. 2F illustrates a block diagram 200F of the base station 204 and the marine display 272 connected via the first wireless link 218A, the cradle 278, and the second wireless link 218B.

As shown in FIG. 2D, the cradle 278 may be configured to receive the marine display 272, and a quick disconnect mechanism (not shown) may be used to physically and electrically couple and decouple the marine display 272 to the cradle 278. In some implementations, the cradle 278 may be used as a power and/or charge station, and the cradle 278 may also be used as a data retrieval station. Thus, the base station 204 may be configured to provide the input power signal 282 and the input data signals 222, 232, 242, 252, 262 as output signals to the marine display 272 via the single cable 206 and the cradle 278. Further, in this instance, the first wired circuit of the single cable 206 may be configured to output the power signal 282 to the marine display 272 via the cradle 278, and the second wired circuit (that is separate from the first wired circuit) of the single cable 206 may be configured to output the data signals 222, 232, 242, 252, 262 to the marine display 272 via the cradle 278.

In reference to FIG. 2E, the base station 204 may be configured to provide the power signal 282 as an output signal to the marine display 272 via the single cable 206 and cradle 278, and further, the base station 204 may be configured to provide the data signals 222, 232, 242, 252, 262 as a wireless output signal to the marine display 272 via the wireless communication link 218. In this instance, the single wired circuit of the single cable 206 may be used to provide power signals 282 to the marine display 272, and the wireless communication link 218 may make use of a transceiver configured to output data signals associated with input signals 222, 232, 242, 252, 262 to the marine display 272. As described herein, the base station 204 and the marine display 272 may be equipped with transceivers (not shown) having antennas configured to communicate with each other. Further, in some instances, the wireless communication link 218 may be used to bi-directionally transmit and receive data signals between the base station 204 and the marine display 272.

In reference to FIG. 2F, the base station 204 may be configured to provide the power signal 282 as a first wireless output signal to the marine display 272 via the first wireless link 218A and the cradle 278, and the base station 204 may be configured to provide the data signals 222, 232, 242, 252, 262 as a second wireless output signal to the marine display 272 via the second wireless link 218B. In this instance, the first wireless link 218A may make use of a first transceiver configured to output the first wireless output signal associated with the power signal 282 to the marine display 272. Further, in this instance, the second wireless link 218B may make use of a second transceiver configured to output data signals associated with input signals 222, 232, 242, 252, 262 to the marine display 272. As described herein, the base station 204 and the marine display 272 may be equipped with multiple transceivers (not shown) with each having antennas configured to communicate with each other. Further, in some instances, the first wireless link 218A may be configured to bi-directionally transmit and receive data signals between the base station 204 and the marine display 272.

FIG. 3 illustrates a system 300 for implementing a base station and a marine display in accordance with various implementations described herein. In particular, FIG. 3 illustrates a block diagram of the system 300 having a base station implemented as a computing device 204 and a marine display implemented as a display device 372.

The computing device 304 (or base station) may be implemented as a device having various components including a housing (e.g., waterproof housing) configured for mounting to a watercraft (e.g., vessel, boat ship, etc.). As described herein, the housing may include a container or a box configured to enclose, encase, or encapsulate various components (e.g., electrical components) of the computing device 304.

The computing device 304 may include a power interface 380 configured to receive power or power signals 382 from a power source 384. The power source 384 may include various types of power sources, such as, e.g., a battery, generator, alternator, and/or various other types of power sources. In some cases, the power source 384 may include an electrical circuit configured to implement multiple power sources. Further, the power interface 380 may be configured to provide power to a display interface 370 based on the power received from the power source 384 via the power signals 382.

Further, in reference to FIG. 3, the computing device 304 may include one or more marine interfaces 314, such as, e.g., marine based communication interfaces, that may be configured to communicate with various different data sources 316 (e.g., marine based data sources) to receive various different marine data 315 therefrom. For instance, the one or more marine interfaces 314 may include a network interface 340 configured to receive marine data, such as, e.g., network data 342, from at least one network source 344. In this instance, the marine data or network data 342 may include Ethernet data, and the network interface 340 may be configured to receive Ethernet data from the network source 344 (e.g., a network server) as an Ethernet data source and provide the Ethernet data to the display interface 370. The network interface 340 may be configured to bi-directionally transmit and receive marine data (e.g., Ethernet data) between the computing device 304 and the network source 344.

In another instance, the one or more marine interfaces 314 may include a geo-coordinate interface 320 configured to receive marine data, such as, e.g., geo-coordinate data 322, from a geo-coordinate source 324. In this instance, the marine data or geo-coordinate data 322 may include Global Position System (GPS) related data, and the geo-coordinate interface 320 may be configured to receive geo-coordinate data 322 (e.g., GPS data) from the geo-coordinate source 324 (e.g., GPS source or transceiver) and provide the geo-coordinate data 322 (e.g., GPS data) to the display interface 370.

In another instance, the one or more marine interfaces 314 may include a NMEA interface 330 configured to receive marine data, such as, e.g., NMEA data 332, from a NMEA source 334. In this instance, the marine data or NMEA data 332 may include National Marine Electronica Association (NMEA) data, and the NMEA interface 320 may be configured to receive NMEA data 332 from the NMEA source 324 and provide the NMEA data 332 to the display interface 370.

In another instance, the one or more marine interfaces 314 may include a sonar interface 350 configured to receive marine data, such as, e.g., sonar data 352, from a sonar source or sonar device 354, such as, e.g., a sonar transducer or a sonar transducer array. In this instance, the sonar interface 350 may be configured to receive sonar data 352 from the sonar source 354 and provide the sonar data 352 to the display interface 370. In various instances, the sonar device 354 (or sonar source) may include one or more sonar transducers or one or more sonar transducer arrays, and the display interface 370 may be configured to receive the sonar data 352 from the sonar device 354 and provide one or more sonar images of an underwater environment to the display device 372 (e.g., remote marine display) based on the sonar data 352.

In another instance, the one or more marine interfaces 314 may include a radar interface 360 configured to receive marine data, such as, e.g., radar data 362, from a radar source or radar device 364, such as, e.g., a radar device or a radar system. In this instance, the radar interface 360 may be configured to receive radar data 362 from the radar source 364 and provide the radar data 362 to the display interface 370. In various instances, the radar device 364 (or radar source) may include a radar system or one or more radar components, and the display interface 370 may be configured to receive the radar data 362 from the radar device 364 and provide one or more radar images to the display device 372 (e.g., remote marine display) based on the radar data 362.

The computing device 304 may include the display interface 370 coupled to the geo-coordinate interface 320 (e.g., GPS interface), the NMEA interface 330, the network interface 340 (e.g., Ethernet interface), the sonar interface 350, the radar interface 360, and the power interface 380. In some implementations, the display interface 370 may be configured to receive power (e.g., power signals 382) from the power interface 380, receive marine data (e.g., GPS data 322, NMEA data 332, and/or network data 342) from the one or more marine interfaces 314 (e.g., GPS interface 320, NMEA interface 330, and/or network interface 340), receive sonar data 352 from the sonar interface 350, and receive radar data 362 form the radar interface 360. Further, the display interface 370 may be configured to provide power (e.g., power signals 382), marine data (e.g., GPS data 322, NMEA data 332, and/or network data 342), sonar data 352, and/or radar data 362 to the display device 372. The display device 372 may be implemented as a marine display or as a remote marine display that is separate from the computing device 304.

As described herein in reference to FIG. 2A, the display interface 370 may be configured to provide power, marine data, and sonar data to the display device 372 (or marine display) via a single cable. As described herein in reference to FIG. 2B, the display interface 370 may be configured to provide power to the display device 372 (or marine display) via a single cable, and the display interface 370 may be configured to provide marine data and sonar data to the display device 372 (or marine display) via a wireless connection. As described herein in reference to FIG. 2C, the display interface 370 may be configured to provide power to the display device 372 (or marine display) via a first wireless connection, and the display interface 370 may be configured to provide marine data and sonar data to the display device 372 (or marine display) via a second wireless connection that is separate from the first wireless connection.

In some implementations, the computing device 304 itself may be embodied as a cradle configured to receive the display device 372 (or marine display), couple to the display device 372 (or marine display), and decouple from the display device 372 (or marine display). In other implementations, as described herein in reference to FIGS. 2D-2F, a cradle 378 may be embodied as a separate component configured to receive the display device 372 (or marine display), couple to the display device 372 (or marine display), and decouple from the display device 372 (or marine display). Further, the computing device 304 may be configured to communicate and/or provide power, marine data, and sonar data to the display device 372 (or marine display) via the cradle 278 in a manner as described in reference to FIGS. 2D-2F.

The computing device 304 may include the processor 310 and memory 312 having instructions that cause the processor 310 to interface with the display interface 370 so as to display images associated with the marine data (e.g., GPS data 322, NMEA data 332, network data 342, sonar data 352, and/or radar data 362) on the display device or remote marine display 372. The memory 312 may also include instructions that cause the processor 310 to interface with the one or more of the marine interfaces, including the geo-coordinate interface 320 (e.g., GPS interface), the NMEA interface 330, the network interface 340, the sonar interface 350, and/or the radar interface 360). Further, in some instances, the instructions may cause the processor 310 to simultaneously display images associated with any one or more or all marine data 322, 332, 342, 352, 362 on the display device 372 in a multi-screen mode of operation. In some other instances, the computing device 304 may be configured to create/generate data logs associated with the marine data 322, 332, 342, 352, 362, including previously recorded marine data.

In some implementations, the computing device 304 may be configured to store/record marine data 322, 332, 342, 352, 362 and/or marine data logs in one or more databases (e.g., database 390). The computing device 304 may be configured to upload the marine data 322, 332, 342, 352, 362 and/or marine data logs to the network source 344, such as, e.g., cloud server or other network server, via network interface 340. The computing device 304 may be configured to store/record multiple marine data logs and create/generate a map therefrom. The computing device 304 and/or the network source or server 340 may be configured to create/generate one or more maps by stitching, combining, and/or joining multiple marine data logs together. The computing device 304 may be configured to receive the geo-coordinate data 322 (e.g., GPS data) via the geo-coordinate source 324 and associate the received geo-coordinate data 322 (e.g., GPS data) to the marine data 332, 342, 352, 362, marine data logs, and/or maps at any time, including prior to upload. The network interface 340 may communicate with the network source or server 344 via any type of wired or wireless communication network, including, e.g., a cloud based wired or wireless communication network.

In various implementations, the computing device 304 may be configured as a special purpose machine for interfacing with each of the one or more marine interfaces 320, 330, 340, 350, 360 and the display interface 370. The computing device 304 may include standard elements and/or components, including the processor 310, the memory 312 (e.g., non-transitory computer-readable storage medium), the at least one database 390, the power interface 380, peripherals, and various other computing elements and/or components that may not be specifically shown in FIG. 3. Further, the computing device 304 may include the display device 372 (e.g., marine based monitor or display) that may be used to provide a user interface (UI) 374, including a graphical user interface (GUI). In reference to FIG. 3, the display device 372 is implemented as a separate component; however, the display device 372 may be incorporated part of the computing device 304. Further, the UI 374 may be used to receive one or more preferences from a user of the display device 372 for managing or utilizing the system 300, including interfacing with the one or more marine interfaces 320, 330, 340, 350, 360 and the display interface 370. As such, a user may setup desired behavior of the computing system 300 and/or interfaces 320, 330, 340, 350, 360, 370 via user-selected preferences using the UI 374 associated with the display device 372. Various elements and/or components of the system 300 that may be useful for the purpose of implementing the system 300 may be added, included, and/or interchanged, in manner as described herein.

In various implementations, wireless charging may include inductive charging, which may use an electromagnetic field (EMF) to transfer energy (or power) between the base station 304 and the display device 372. For instance, power in the form of energy may be transferred from the base station 304 through inductive coupling to the display device 372, which may be configured to use the transferred power or energy for running power or to charge an internal power source, such as, e.g., rechargeable batteries. Further, various other wireless powering/charging techniques may be used to transfer power or energy from the base station 304 to the display device 372. For instance, radio frequency (RF) harvesting techniques may be used for this purpose. As such, in this instance, the base station 304 may be configured to transmit wireless RF signals to the display device 372, and the display device 372 may be configured to receive the wireless RF signals and harvest the RF power or energy from the received wireless RF signals for running power or to charge the internal power source, such as, e.g., rechargeable batteries.

Figure 4:
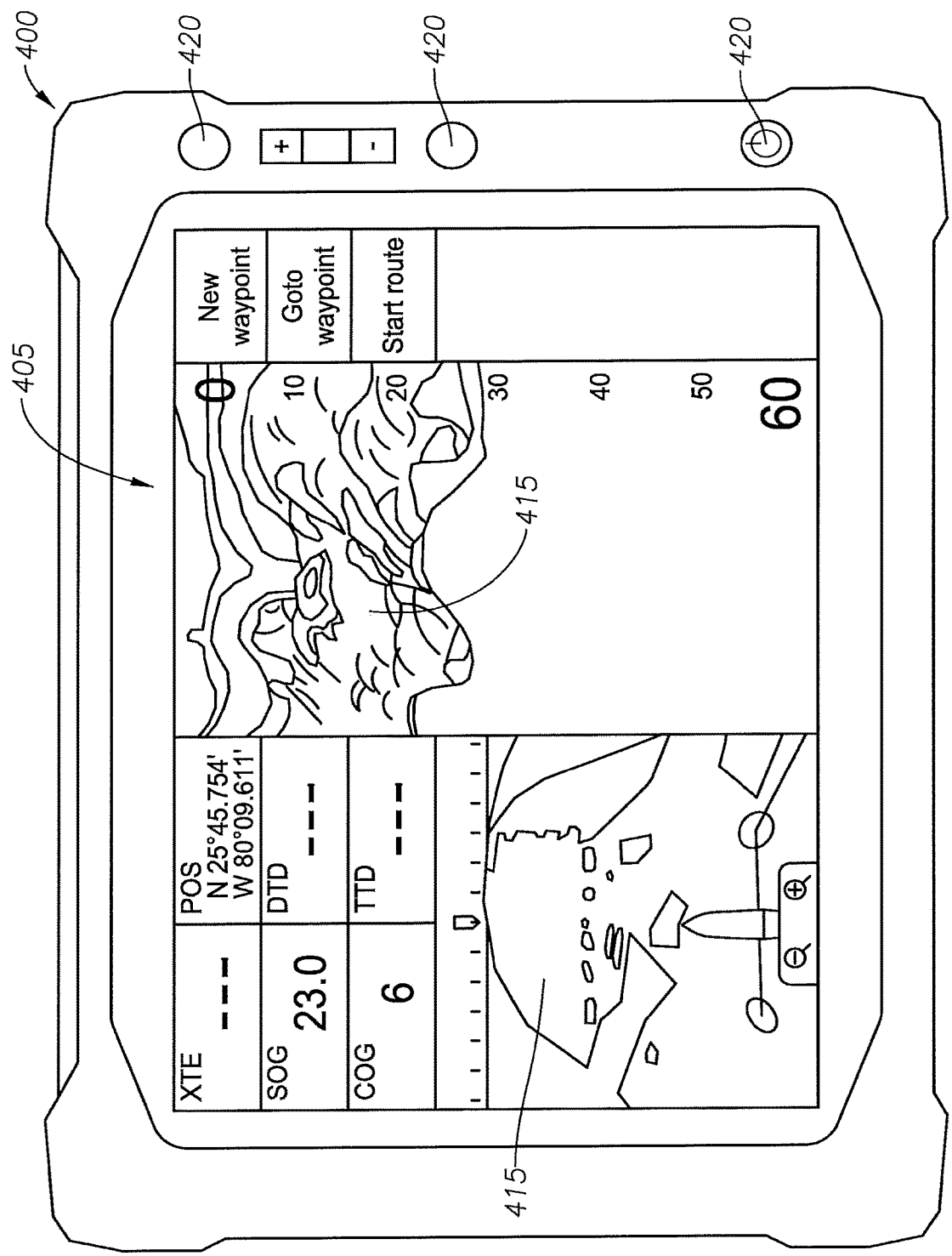
FIG. 4 illustrates a schematic of a marine electronics device in accordance with various implementations described herein.

FIG. 4 illustrates an instance schematic of a marine electronics device 400 in accordance with various implementations of described herein. The marine electronics device 400 includes a screen 405. In some instances, the screen 405 may be sensitive to touching by a finger. In other instances, the screen 405 may be sensitive to body heat from a finger, a stylus, or responsive to a mouse.

The marine electronics device 400 may be operational with numerous general purpose or special purpose computing system environments and/or configurations. The marine electronics device 400 may include any type of electrical and/or electronics device capable of receiving data and information via a computing system or device, such as, e.g., the computing device 304 of FIG. 3. The marine electronics device 400 may include various marine instruments, such that the marine electronics device 400 may use the computing system to display various types of marine electronics data. The device 400 may display marine electronic data 415, such as, e.g., sonar data and images associated with sonar data. The marine electronic data types 415 may include chart data, radar data, sonar data, steering data, dashboard data, navigation data, fishing data, engine data, and the like. The marine electronics device 400 may include a plurality of buttons 420, which may be include physical buttons or virtual buttons, or a combination thereof. The marine electronics device 400 may receive user input through the screen 405, which may be configured as sensitive to touch or buttons 420.

In some implementations, the marine electronics device 400 may be configured as a computing device having a central processing unit (CPU), system memory, graphics processing unit (GPU), and a system bus that couples various components including the system memory to the CPU. In various implementations, the computing system may include one or more CPUs, which may include a microprocessor, a microcontroller, a processor, a programmable integrated circuit, or a combination thereof. The CPU may include an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. The GPU may generate graphical user interfaces that present the output data. The GPU may also provide objects, such as menus, in the graphical user interface. A user may provide inputs by interacting with the objects. The GPU may receive the inputs from interaction with the objects and provide the inputs to the CPU. A video adapter may be provided to convert graphical data into signals for a monitor (MFD 400). The monitor (MFD 400) includes a screen 405. As described herein, the screen 405 may be sensitive to touching by a human finger, and/or the screen 405 may be sensitive to the body heat from a human finger, a stylus, and/or responsive to a mouse.

In accordance with various implementations described herein, various portions of following description may or may not be applied to the computing device 304 of FIG. 3 and/or to the marine electronics device 400 of FIG. 4. Generally, the computing device 304 of FIG. 3 does not include a display device as part thereof. Instead, the computing device 304 may be implemented as a base station that is configured to communicate with a display device or marine display, such as, e.g., the marine electronics device 400 of FIG. 4. Thus, references made to a computing system and/or computing components may or may not be applied to the computing device 304 of FIG. 3.

In some implementations, the system bus may be any of several types of bus structures, including a memory bus or memory controller, a peripheral bus, and a local bus using any of a variety of bus architectures. By way of instance, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For instance, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which may be used to store the desired information and which may be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of instance, and not limitation, communication media may include wired media such as a wired network or direct-wired connection, and wireless media such as acoustic, radio frequency (RF), infrared (IR), and other wireless media. The computing system may include a host adapter that connects to a storage device via a small computer system interface (SCSI) bus, Fiber Channel bus, eSATA bus, or using any other applicable computer bus interface.

The computing system may also be connected to a router to establish a wide area network (WAN) with one or more remote computers. The router may be connected to the system bus via a network interface. The remote computers may also include hard disks that store application programs. In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™ technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some instances, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for instance, recorded points. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons, which may be physical buttons, virtual buttons, or combinations thereof. Other input devices may include a microphone, a mouse, or the like (not shown). These and other input devices may be connected to the CPU through a serial port interface coupled to system bus, but may be connected by other interfaces, such as a parallel port, game port or a universal serial bus (USB).

Certain implementations may be configured to be connected to a global positioning system (GPS) receiver system and/or a marine electronics system. The GPS system and/or marine electronics system may be connected via the network interface. The GPS receiver system may be used to determine position data for the vessel on which the marine electronics device 400 is disposed. The GPS receiver system may then transmit the position data to the marine electronics device 400. In other instances, any positioning system known to those skilled in the art may be used to determine and/or provide the position data for the marine electronics device 400.

The marine electronics system may include one or more components disposed at various locations on the vessel. Such components may include one or more data modules, sensors, instrumentation, and/or any other devices known to those skilled in the art that may transmit various types of data to the marine electronics device 400 for processing and/or display. The various types of data transmitted to the marine electronics device 400 from the marine electronics system may include marine electronics data and/or other data types known to those skilled in the art. The marine electronics data received from the marine electronics system may include chart data, sonar data, structure data, radar data, navigation data, position data, heading data, automatic identification system (AIS) data, Doppler data, speed data, course data, or any other type of data.

The marine electronics device 400 may receive external data via a network, such as a LAN or WAN. In various implementations, external data may relate to data and information not available from the marine electronics system. The external data may be retrieved from the Internet or any other source. The external data may include various environmental data, such as, e.g., atmospheric temperature, tidal data, weather, moon phase, sunrise, sunset, water levels, historic fishing data, and other fishing data.

In one implementation, the marine electronics device 400 may be a multi-function display (MFD) unit, such that the marine electronics device 400 may be capable of displaying and/or processing multiple types of marine electronics data. FIG. 4 illustrates a schematic diagram of an MFD unit in accordance with implementations of various techniques described herein. In particular, the MFD unit may include the computing system, the monitor (MFD 400), the screen 405, and the buttons 420 such that they may be integrated into a single console.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, instances of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For instance, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as instance forms of implementing the claims.

What is claimed is:

1. A system for providing power, marine data, and sonar data to a marine display, the system comprising:
   a base station including a housing configured for mounting to a watercraft, wherein the base station comprises:
   a display interface configured to provide marine data and sonar data to the marine display, wherein the marine display is separate from the base station;
   a network interface coupled to the display interface and configured to receive the marine data from at least one network server and provide the marine data from the base station to the marine display via the display interface; and
   a sonar interface coupled to the display interface and configured to receive the sonar data from a sonar device and provide the sonar data from the base station to the marine display via the display interface,
   wherein the display interface is configured to provide the marine data and the sonar data to the marine display via a first wireless connection, and
      a cradle comprising one or more attachment features configured to removably receive and attach to the marine display, wherein the cradle is physically and electrically coupled to the marine display when the marine display is attached to the cradle, and the cradle is physically and electrically decoupled from the marine display when the marine display is detached from the cradle,
   wherein the base station comprises a power interface configured to receive the power from a power source and provide the power from the base station to the marine display through the cradle,
   wherein the base station is configured to provide the power to the cradle via a second wireless connection, and
   wherein the second wireless connection is separate from the first wireless connection.

2. The system of claim 1, wherein the base station is configured to provide the power to the cradle.

3. The system of claim 1, wherein the housing comprises a waterproof housing.

4. The system of claim 1, wherein the marine data comprises geo-coordinate data, and wherein the network interface is configured to receive geo-coordinate data from a geo-coordinate data source and provide the geo-coordinate data to the display interface.

5. The system of claim 1, wherein the marine data comprises National Marine Electronics Association (NMEA) data, and wherein the network interface is configured to receive NMEA data from a NMEA data source and provide the NMEA data to the display interface.

6. The system of claim 1, wherein the marine data comprises Ethernet data,
   and wherein the network interface is configured to receive Ethernet data from an Ethernet data source and provide the Ethernet data to the display interface.

7. The system of claim 1, wherein the sonar device comprises a sonar transducer, and wherein the display interface is configured to receive the sonar data from the sonar device and provide one or more sonar images of an underwater environment to the marine display based on the sonar data.

8. The system of claim 1, wherein the base station further comprises a radar interface configured to receive radar data from a radar device, wherein the display interface is coupled to the radar device and is configured to receive the radar data from the radar device, and provide the radar data to the marine display.

9. The system of claim 1 further comprising the marine display.

10. A system for providing power, marine data, and sonar data to a marine display, the system comprising:
    a base station including a housing configured for mounting to a watercraft, wherein the base station comprises:
    a display interface configured to provide marine data and sonar data to the marine display via a cradle, wherein the marine display is separate from the base station;
    a network interface coupled to the display interface and configured to receive the marine data from at least one network server; and
    a sonar interface coupled to the display interface and configured to receive the sonar data from a sonar device, and
    the cradle comprising one or more attachment features configured to removably receive and attach to the marine display such that the marine display physically and electronically couples and decouples from the cradle, wherein the display interface of the base station is configured to provide the marine data and the sonar data to the cradle, wherein the cradle provides the power, the marine data, and the sonar data to the marine display, when the marine display is attached to the cradle, wherein the marine display is a single console,
    wherein the display interface is configured to provide the marine data and the sonar data via a first wireless connection,
    wherein the base station comprises a power interface configured to receive the power from a power source and provide the power from the base station to the marine display through the cradle,
    wherein the base station is configured to provide the power to the cradle via a second wireless connection, and
    wherein the second wireless connection is separate from the first wireless connection.

11. The system of claim 10, wherein the marine data comprises geo-coordinate data, and wherein the network interface is configured to receive geo-coordinate data from a geo-coordinate data source and provide the geo-coordinate data to the display interface.

12. The system of claim 10, wherein the marine data comprises National Marine Electronics Association (NMEA) data, and wherein the network interface is configured to receive NMEA data from a NMEA data source and provide the NMEA data to the display interface.

13. The system of claim 10, wherein the marine data comprises Ethernet data,
    and wherein the network interface is configured to receive Ethernet data from an Ethernet data source and provide the Ethernet data to the display interface.

14. The system of claim 10, wherein the sonar device comprises a sonar transducer, and wherein the display interface is configured to receive the sonar data from the sonar device and provide one or more sonar images of an underwater environment to the marine display based on the sonar data.

15. The system of claim 1, wherein the cradle is configured to provide a quick disconnect mechanism to physically and electrically couple and decouple the marine display to and from the cradle, respectively.

16. The system of claim 1, wherein the marine display is a marine electronic device or a tablet.

17. The system of claim 16, wherein the marine display is a single console.

18. The system of claim 10, wherein the marine display is configured to be coupled to and decoupled from the cradle via a quick disconnect mechanism.

19. A system for providing power, marine data, and sonar data to a marine display, the system comprising:
- a base station including a housing configured for mounting to a watercraft, wherein the base station comprises:
- a display interface configured to provide marine data and sonar data to the marine display, wherein the marine display is separate from the base station;
- a network interface coupled to the display interface and configured to receive the marine data from at least one network server and provide the marine data from the base station to the marine display via the display interface; and
- a sonar interface coupled to the display interface and configured to receive the sonar data from a sonar device and provide the sonar data from the base station to the marine display via the display interface,
wherein the display interface is configured to provide the marine data and the sonar data to the marine display via a first wireless connection,
wherein the base station comprises a power interface configured to receive the power from a power source and provide the power from the base station to the marine display,
wherein the base station is configured to provide the power to the marine display via a second wireless connection, and
wherein the second wireless connection is separate from the first wireless connection.

20. The system of claim 19 further comprising the marine display.

* * * * *

UNITED STATES PATENT AND TRADEMARK OFFICE
CERTIFICATE OF CORRECTION

| | |
|---|---|
| PATENT NO. | : 11,747,433 B2 |
| APPLICATION NO. | : 16/437035 |
| DATED | : September 5, 2023 |
| INVENTOR(S) | : Pablo Eynon, Paul Robert Bailey and Chris Richardson |

It is certified that error appears in the above-identified patent and that said Letters Patent is hereby corrected as shown below:

On the Title Page

Under item (71) Applicant, should read:
-- Navico, Inc. --

Instead of:
"NAVICO HOLDING AS".

Signed and Sealed this
Tenth Day of October, 2023

Katherine Kelly Vidal
*Director of the United States Patent and Trademark Office*